No. 624,753. Patented May 9, 1899.
G. M. CLUBB.
WEDGE CUTTING MACHINE.
(Application filed Aug. 26, 1898.)
(No Model.) 2 Sheets—Sheet 2.
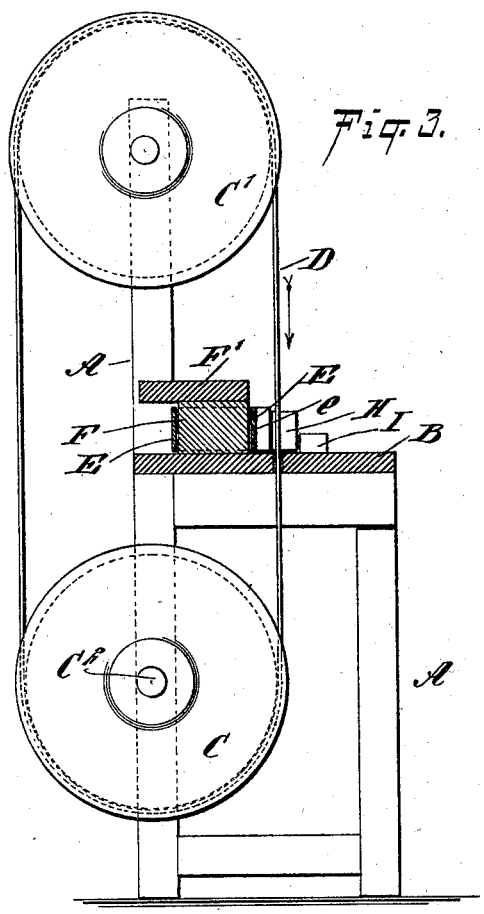
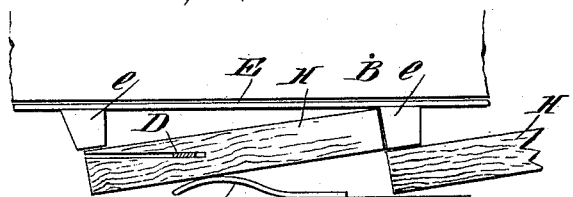
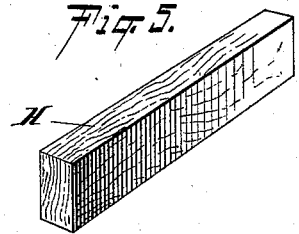
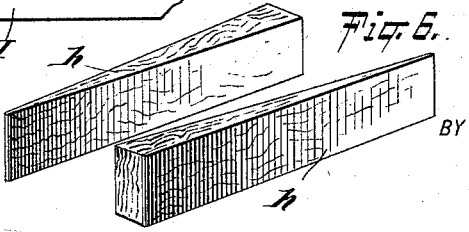
WITNESSES:
William P. Goebel.
H. L. Reynolds.
INVENTOR
G. M. Clubb.
BY
ATTORNEYS.

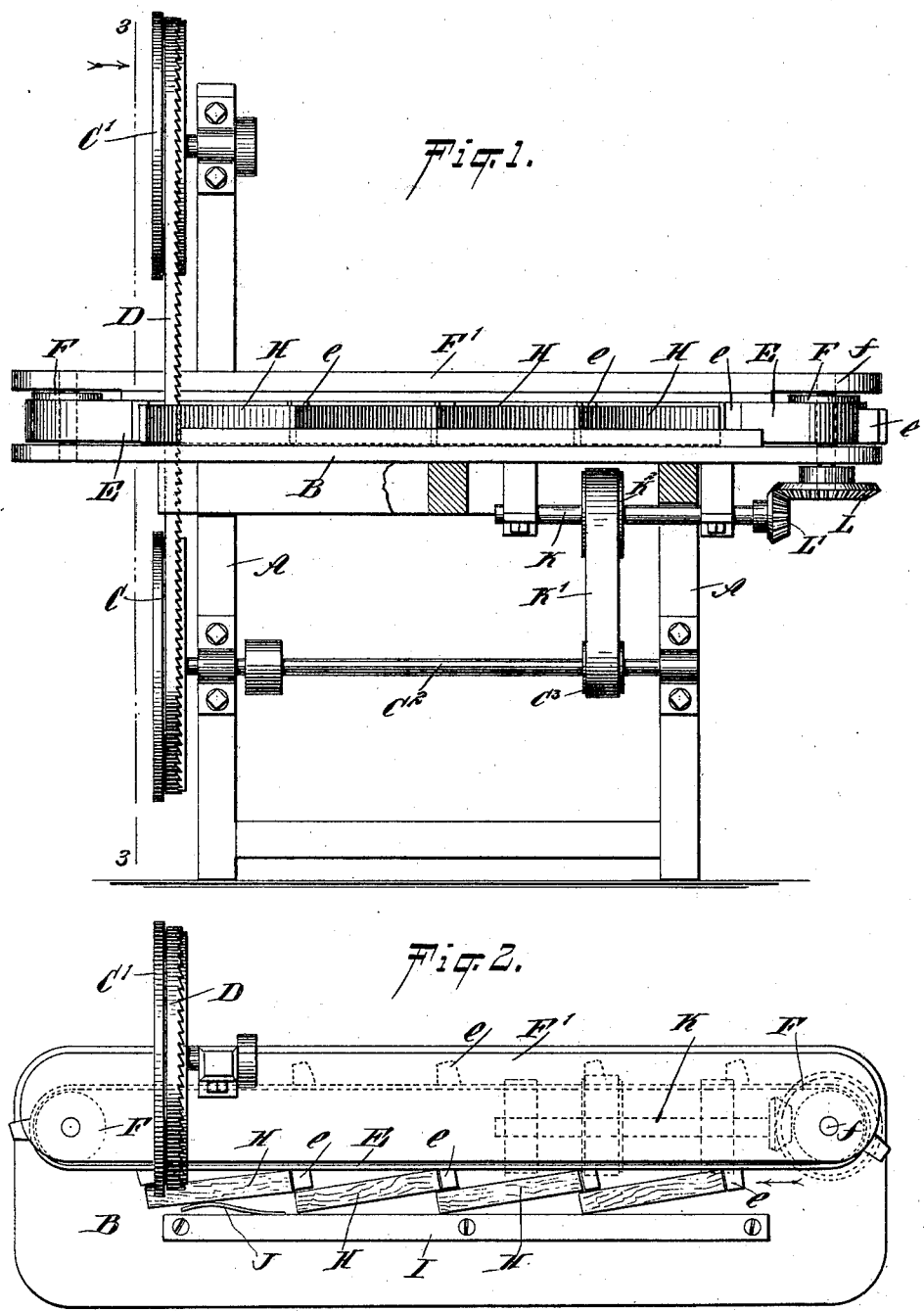

UNITED STATES PATENT OFFICE.

GEORGE MURRISON CLUBB, OF MULLAN, IDAHO.

WEDGE-CUTTING MACHINE.

SPECIFICATION forming part of Letters Patent No. 624,753, dated May 9, 1899.

Application filed August 26, 1898. Serial No. 689,577. (No model.)

*To all whom it may concern:*

Be it known that I, GEORGE MURRISON CLUBB, of Mullan, in the county of Shoshone and State of Idaho, have invented a new and Improved Wedge-Cutting Machine, of which the following is a full, clear, and exact description.

My invention relates to an improvement in devices for cutting wedges for various purposes, and it comprises the novel features hereinafter described and claimed.

Reference is to be had to the accompanying drawings, forming a part of this specification, in which similar characters of reference indicate corresponding parts in all the figures.

Figure 1 is a side elevation of my machine with parts in section. Fig. 2 is a top plan view of the same. Fig. 3 is an end elevation with the table in section. Fig. 4 is a detail plan view showing the saw during the process of making a wedge. Fig. 5 is a perspective view of one of the blocks from which the wedges are made, and Fig. 6 is a perspective view of two wedges made from one of the blocks shown in Fig. 5.

The object of my invention is to make wedges rapidly where required in large quantities. Large numbers of these wedges are required in mines for tightening the supporting-timbers. My machine when supplied with rectangular blocks will rapidly rip the block diagonally, forming two wedges from each block.

Upon any suitable framework A is constructed a table B, and upon a portion of the framework are mounted the two band-wheels C and C', upon which is placed a band-saw D. I have herein shown my device as using a band-saw, although it is evident that a circular saw might be used instead of the band-saw; but the band-saw has some advantages over the circular saw and its use is preferred.

Upon the table B is mounted an endless belt E, which lies above the table and close thereto and is supported upon and turned by two pulleys F, located one at each end of the table. The belt is covered by a plate F', which also forms a support for the upper ends of the journals carrying the pulleys. One of these journals, as the journal $f$, located farthest from the band-saw, extends downward through the table and carries a bevel-gear L, and a bevel-pinion L', mounted upon a horizontal shaft K beneath the table, meshes with the gear L and turns the same. The shaft K is turned by means of a belt K', which passes over a pulley $K^2$ upon the shaft and over another pulley $C^3$ upon the shaft $C^2$, the latter being the shaft of the lower band-wheel C. By this means the belt E is given a constant forward motion, said motion being derived from the band-wheels carrying the saw.

The belt E has a series of blocks $e$ located thereon and spaced a distance apart somewhat less than the lengths of the blocks H, from which the wedges are to be made. At a suitable distance from the face of the belt E is placed a guide or guard I, which consists of a bar that is parallel with the belt and at such a distance therefrom that the blocks H may lie between the outer surface of the blocks $e$ and the guard I. The blocks are placed in position upon the belt in the manner shown in Fig. 2, the forward end of each block H overlapping a block $e$ upon the belt and the rearward end of the preceding block H. By this means the blocks H are presented to the saw and held in a diagonal position, so that the saw will rip them from one corner to the opposite corner, forming from each block two wedges $h$, such as are shown in Fig. 6.

In order to insure that the block H which is being ripped shall be held in its proper position, a flat spring J is employed, attached at one end to the guard I and engaging the blocks H to press them inward or toward the belt E. This spring supports the outer side of the block and prevents its being forced outward or away from the belt when the block is engaged by the saw.

By means of this machine a large number of wedges may be made in a short time and all the wedges will be of exactly the same size and bevel. The machine will thus materially reduce the cost of wedges where large numbers are to be used.

Having thus fully described my invention, I claim as new and desire to secure by Letters Patent—

1. A machine for cutting wedges, comprising a saw, a saw-table, and an endless belt traveling over the saw-table with one side close to and parallel with the saw, said belt having combined feeding and spacing blocks thereon adapted to engage and present rectangular blocks to the saw so as to be ripped diagonally, substantially as set forth.

2. A machine for cutting wedges, comprising a saw, a saw-table, an endless belt traveling over the saw-table with one side close to and parallel with the saw, said belt having combined feeding and spacing blocks thereon adapted to engage and present rectangular blocks to the saw so as to be ripped diagonally, and a guard or guide upon the saw-table, adapted to engage the outer corners of the wedge-blocks while moving to the saw, substantially as described.

3. A machine for cutting wedges, comprising a saw, a saw-table, an endless belt traveling over the saw-table with one side close to and parallel with the saw, said belt having combined feeding and spacing blocks thereon adapted to engage and present rectangular blocks to the saw so as to be ripped diagonally, and a spring alongside of the cutting edge of the saw and yieldingly engaging the outer surface of the rectangular blocks, substantially as described.

4. A machine for cutting wedges, comprising a saw, a saw-table, an endless belt traveling over the surface of the saw-table, said belt having blocks thereon adapted to engage and present rectangular blocks to the saw with their forward ends inclined outward or away from the belt so as to bring their diagonals in line with the saw, and operative connection between the saw and the belt, substantially as described.

5. A machine for cutting wedges, comprising a band-saw, a saw-table, and an endless belt traveling over the surface of the table with one end close to and parallel with the saw, said belt having blocks thereon adapted to engage and present rectangular blocks to the saw so as to be ripped diagonally, substantially as described.

6. A machine for cutting wedges, comprising a saw, a saw-table, an endless belt traveling over the surface of the saw-table with one side close to and parallel with the saw, said belt having combined feeding and spacing blocks thereon adapted to engage and present rectangular blocks to the saw so as to be ripped diagonally, and operative connection between the belt and the saw-shaft, substantially as described.

GEORGE MURRISON CLUBB.

Witnesses:
   W. F. HERRINGTON,
   H. J. ROSSI.